United States Patent Office 3,549,201
Patented Dec. 22, 1970

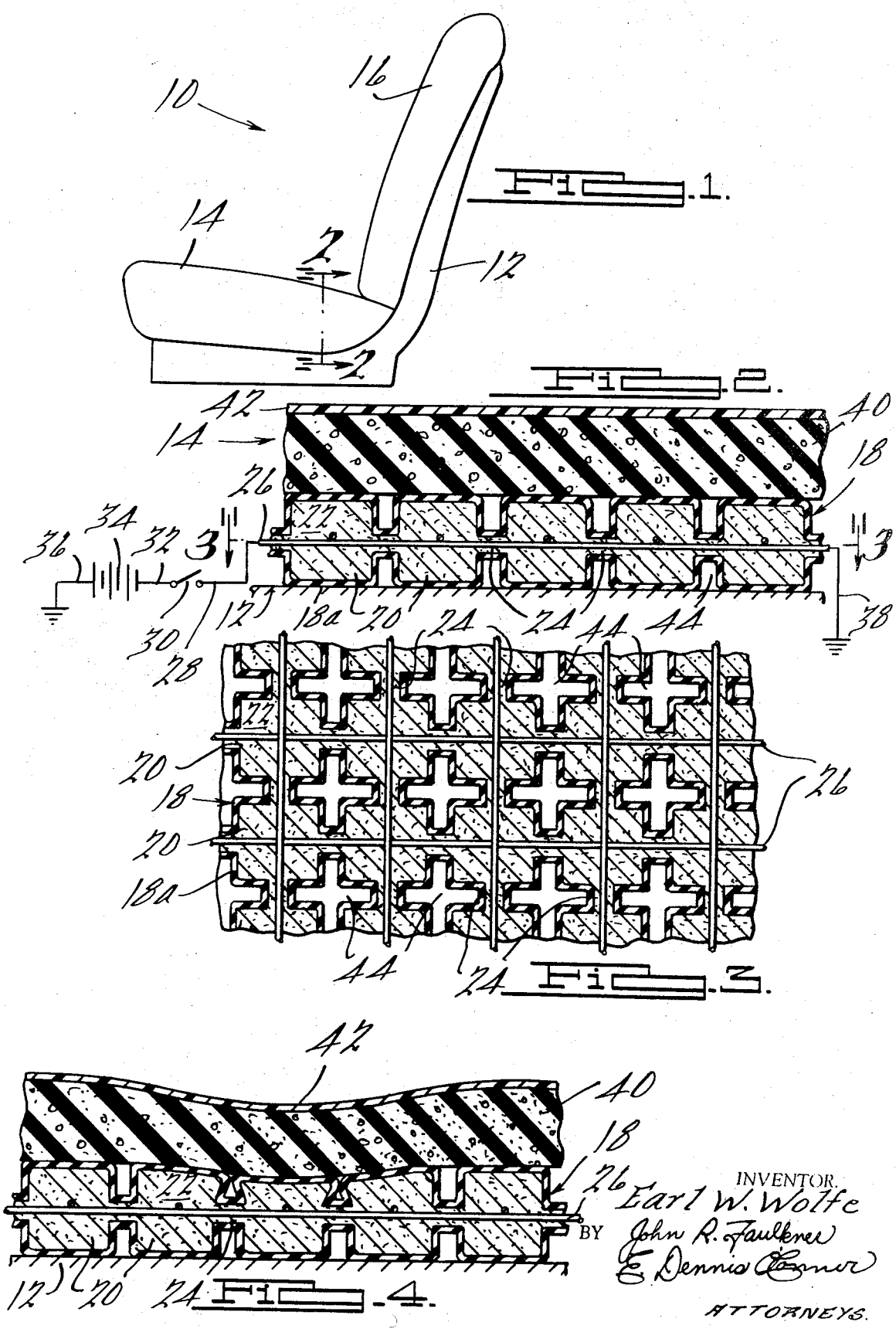

3,549,201
MULTIPLE CONTOUR UPHOLSTERY PANEL
Earl W. Wolfe, Dearborn, Mich., assignor to Ford Motor Company, Dearborn, Mich., a corporation of Delaware
Filed Apr. 3, 1969, Ser. No. 813,003
Int. Cl. A47c 27/08, 27/18
U.S. Cl. 297—284          13 Claims

ABSTRACT OF THE DISCLOSURE

An upholstery panel adapted to support a human body and capable of being formed into various contours to accommodate bodies of various dimensions. At elevated temperatures caused by heating means contained within said panel, an encapsulated substance having a solid state at ambient temperatures becomes flowable. The weight of a supported body causes displacement of this substance and a resulting panel contour corresponding to the body causing the displacement. Maintenance of this contour may be accomplished by discontinuing heating and allowing the substance to cool to an ambient temperature.

BACKGROUND OF THE INVENTION

Recent advances in the state of the art of human engineering greatly have increased knowledge concerning the design of upholstery panels to be used as cushions to support human bodies. In particular, upholstery panel contours providing for greater comfort and minimization of fatigue now may be designed for a human body of particular dimension. One application of this knowledge may be found in various research projects wherein human bodies subjected to abnormally large forces have been supported on couches having special contours designed relative to the dimensions of the particular human bodies to be supported.

It has not been considered economically feasible to accommodate the variences in human body dimensions on a wide commercial scale. As may be seen from U.S. Pat. 2,847,061, the prior art teaches methods of producing seats contoured to correspond to particular bodies. However, such methods obviously cannot be adapted to mass produced seat cushions as may be appreciated by reference to the seats included in motor vehicles.

Such motor vehicle seats do incorporate the most recent human engineering principles, relative to upholstery cushion contours, that are feasible in a mass produced item. Purely technical principles must be comprised to some degree, however, so that a maximized percentage of the general public, having an almost infinite variety of body dimensions, may be accommodated in comfort in vehicle seats. It thus readily is understandable that a motor vehicle seat specifically designed for a single human body and having upholstery cushion contours corresponding to the contours of this single body is the optimum seat for this body and possesses certain advantages over vehicle seats now in production. It is understandable equally that such an individually tailored seat cannot be offered in mass produced vehicles because of production capabilities and cost considerations.

It is an object of this invention to provide a particular upholstery panel that may be used as a body supporting cushion and that allows the incorporation of an individually contoured cushion in a mass produced seating assembly. This upholstery panel is capable of being formed into any one of an infinite variety of contours by the weight of a supported human body and will maintain such a contour until it is desired that the panel be formed into a different contour. Furthermore, the upholstery panel of this invention may be mass produced and such production may be accomplished at an economical cost when compared to the cost of individually tailored upholstery cushions.

SUMMARY OF THE INVENTION

A multiple contour upholstery panel adapted to support the weight of a human body and constructed in accordance with this invention comprises a deformable member formed from flexible material defining a plurality of open cells. This deformable member has an impervious, flexible, outer skin. The individual cells contain a substance having a solid state at ambient temperatures, that becomes flowable when heated to a predetermined temperature somewhat above ambient temperatures. Intermittently operable heating means are provided and are mounted contiguously to the deformable member. These heating means may be operated to heat the substance contained in the cells above the predetermined temperature such that the substance becomes flowable, and an inoperative condition when no heating occurs. This arrangement allows for a deformable member contour to be formed by the weight of a supported human body when the heating means are in the operative condition. This contour may be maintained with the heating means in an inoperative condition, subsequent to the removal of the weight of the suported human body until such time as another contour is desired. When a second contour is desired, the heating means may be rendered operative again so that the substance contained in the deformable member cells is flowable and may be forced into a second contour.

DESCRIPTION OF THE DRAWINGS

FIG. 1 is a side elevational view of a seat including at least one multiple contour upholstery panel constructed in accordance with this invention;

FIG. 2 is an enlarged sectional view taken along the line 2—2 of FIG. 1;

FIG. 3 is a partial sectional view taken along the line 3—3 of FIG. 2; and

FIG. 4 is a view similar to FIG. 2 but showing a multiple contour upholstery panel of this invention deformed into a particular contour as by the weight of a supported human body.

DETAILED DESCRIPTION OF THE INVENTION

Referring now in detail to the drawing, the numeral 10 denotes generally a seat such as may be used in a motor vehicle. Seat 10 includes a frame 12 mounting a horizontal upholstery panel 14 adapted to be a seat cushion and a vertical upholstery panel 16 adapted to be a back rest. FIGS. 2 and 3 illustrate in detail the particular construction of the horizontal upholstery panel 14, but it should be recognized that the vertical upholstery panel 16 could be constructed in a like manner as could any upholstery panel design to support the weight of the human body.

Upholstery panel 14 includes a deformable member 18 supported on seat frame 12. Deformable member 18 may be characterized as a "waffle blanket" because of the particular structure of this member. Such waffle blankets are available on the commercial market.

Deformable member 18 is constructed of a flexible outer skin 18a defining a plurality of individual cells 20. These cells are filled with a low melting point substance 22 having a solid state at ambient temperatures, but that becomes flowable when elevated in temperature to a predetermined point above ambient temperatures. Various types of waxes have been found suitable for use as encapsulated substance 22. Substance 22, when in the flowable condition, may flow between the cells 20 because these cells are of the open type and are connected as at 24 such that each individual cell is interconnected with a plurality of other cells. The significance of this open cell construction will be explained in detail below.

Extending throughout cells 20 of deformable member 18 is a heating grid 26. This grid is formed from individual resistance heating wires extending within deformable member 18 from cell to cell such that the resistance heating wires are in intimate contact with substance 22. As illustrated in FIG. 2, heating grid 26 is electrically connected by a conductor 28 to an electric switch 30 that, in turn, is connected by a conductor 32 to a source 34 of electrical current. Current source 34 is connected by a conductor 36 to ground. Heating grid 26 is connected to ground by electrical conductor 38.

Overlying deformable member 18 and extending coextensive therewith is padding 40 that may be urethane foam or the like. This padding is positioned so that it is located between the deformable member 18 and the human body to be supported by upholstery panel 14. A conventional decorative outer skin 42 formed from material such as cloth or vinyl overlies padding 40.

With reference to the structure described above, it readily may be appreciated that when a vehicle occupant first is supported by upholstery panel 14, switch 30 may be closed such that electric current passes through heating grid 26. Grid 26 has a heating capacity so that the temperature of substance 22 is raised above the predetermined temperature at which substance 22 becomes flowable. With substance 22 in the flowable condition, this substance may flow from one cell to another due to the force of weight exerted by the body of the seated passenger. Flow of substance 22 from cell to cell also is facilitated by the spaces 44 present between the individual cells 20. These spaces 44 allow individual cells to expand and contract as illustrated in FIG. 4 of the drawing when the deformable member 18 is deformed due to the weight of the seated passenger.

It thus may be seen that the deformable member 18 will have transmitted thereto through padding 40 the forces caused by the weight of the seated passenger such that deformable member 18 will be contoured corresponding to the contour of the seated pasenger. Once such a contouring of deformable member 18 is accomplished, switch 30 may be opened and the flow of current to heating element 26 discontinued so that substance 22 cools to ambient temperatures and assumes a solid state once again.

Subsequent to the return of substance 22 to the solid state following a deformation thereof, the contour caused by the weight of the seated passenger is maintained as long as heating grid 26 remains inoperative. If this contour is to be changed, switch 30 may be closed so that substance 22 becomes heated to the flowable point at which time upholstery panel 14 is capable of being formed into a second contour.

It readily may be appreciated that the invention described above has wide applicability not only in the vehicle seat art but in the upholstery panel art generally where cushion structures are used to support the weight of human bodies. It also should be understood that alternative structures readily are available to be used in the furtherance of this invention. For example, deformable member 18 may be constructed of open cell urethane foam impregnated with substance 22. Also, electrical resistance elements are available such that grid 26 need not extend through deformable member 18, but need only be in sufficient proximity so that substance 22 is heated above the temperature whereat this substance becomes flowable. In addition, switch 30 may be manually operable or may be located within the upholstery panel itself such that it is responsive to the weight of a seated passenger and is closed whenever a human body is supported by the upholstery panel.

I claim:

1. An upholstery panel comprising a flexible cellular member including a plurality of individual cells, each of said cells being interconnected with at least one of said other cells, each of said cells being at least partially filled with a substance having a solid state at ambient temperatures and that becomes flowable at a predetermined temperature above ambient temperatures, intermittantly operable heating means mounted contiguously to said substance and capable of heating said material to a temperature exceeding said predetermined temperature, and control means connected to said heating means to actuate and deactuate said heating means.

2. The structure of claim 1, wherein said upholstery panel is included in a cushion adapted to support the weight of a human body, padding positioned adjacent to said cellular member such that said padding is between said cellular member and the human body to be supported.

3. The upholstery panel of claim 1, wherein said heating means includes an electrically conductive resistance heating element, and a source of electric current, said control means comprising a switch electrically connected between and to said element and said current source.

4. The upholstery panel of claim 3, wherein said heating element extends into said cellular member and is in intimate contact with said substance.

5. The upholstery panel of claim 4, wherein said heating element comprises a grid formed from a plurality of resistance heating wires, said grid being coextensive with said cellular member.

6. Cushion structure adapted to support the weight of a human body and comprising: a deformable member formed from flexible material and defining a plurality of open cells, said deformable member having an impervious flexible outer skin, said cells containing a substance having a solid state at ambient temperatures and becoming flowable when heated to a predetermined temperature above ambient temperatures, and heating means mounted-contiguously to said deformable member and capable of heating said material to a temperature exceeding said predetermined temperature, whereby said substance becomes flowable and is formed into a contour corresponding to the body supported by said cushion structure.

7. The cushion structure of claim 6, further comprising padding positioned adjacent said deformable member and lying coextensive with said deformable member, said padding located between said deformable member and a supported human body.

8. The cushion structure of claim 6, wherein said heating means includes a grid coextensive with said deformable member and formed from a plurality of resistance heating wires, conductive means electrically connecting said grid to a source of current, said wires extending through said deformable member and being in intimate contact with said substance.

9. Cushion structure adapted to support the weight of a human body and comprising: a deformable member formed from flexible material defining a plurality of open cells, said deformable member having an impervious flexible outer skin, said cells containing a substance having a solid state at ambient temperatures and becoming flowable when heated to a predetermined temperature above ambient temperatures, and intermittantly operable heating means mounted contiguously to said deformable member and having an operative condition in which said heating means are capable of heating said substance above said predetermined temperature and an inperative condition, whereby a deformable member contour formed by the weight of a supported human body when said heating means are in the operative condition may be maintained with said heating means in the inoperative condition subsequent to the removal of the weight of the supported human body.

10. The cushion structure of claim 9, further comprising padding extending coextensive with said deformable member and positioned between said deformable member and a supported human body.

11. The cushion structure of claim 9, wherein said heating means includes an electrically conductive resistance heating element and a source of electric current, said heating element being connected to said current source through a switch.

12. The cushion structure of claim 11, wherein said heating element extends into said cellular member and is in intimate contact with said substance.

13. The cushion structure of claim 12, wherein said heating element comprises a grid formed from a plurality of resistance heating wires, said grid being coextensive with said deformable member.

References Cited

UNITED STATES PATENTS

| 3,308,491 | 3/1967 | Spence | 5—348 |
| 3,326,601 | 6/1967 | Vanderbilt et al. | 297—284 |
| 3,330,598 | 7/1967 | Whiteside | 297—284 |

CASMIR A. NUNBERG, Primary Examiner

U.S. Cl. X.R.

297—459